United States Patent [19]  
Lawrence

[11] Patent Number: 4,540,994  
[45] Date of Patent: Sep. 10, 1985

[54] RELEASABLE PEN BLOCK GUIDE

[75] Inventor: James Lawrence, Irvine, Calif.

[73] Assignee: Sanders Associates, Inc., Nashua, N.H.

[21] Appl. No.: 633,173

[22] Filed: Jul. 23, 1984

[51] Int. Cl.³ ............................................. G01D 15/16
[52] U.S. Cl. ................................................... 346/139 R
[58] Field of Search ........... 346/139 R, 139 A, 139 B, 346/140 R

[56] References Cited

U.S. PATENT DOCUMENTS

| 2,655,426 | 10/1953 | Barnes, Jr. | 346/139 R |
| 3,360,799 | 12/1967 | Polster | 346/139 B |
| 3,778,840 | 12/1973 | Rahl | 346/140 A X |

Primary Examiner—George H. Miller, Jr.
Attorney, Agent, or Firm—Louis Etlinger; W. F. Porter, Jr.

[57] ABSTRACT

A releasable pen block guide for releasably holding the pen block carriage of an X-Y plotter against the track during horizontal traverse movement. A first pair of wheel sets disposed in 90° relationship are rigidly attached to one side of the pen block so as to guide the pen block carriage along the track when held in contact with one of the edges of the track. A pair of second, double, bogey-mounted wheel sets similarly aligned are carried by the pen block carriage and adapted for movement between a first position in contact with the other of the edges of the track and a second position out of contact with the other of the edges of the track and spaced from the first wheel sets sufficiently to allow the pen block carriage to be removed from the track. The second wheel sets are mounted to respective ends of a leaf spring extending outwardly from the pen block carriage in opposite directions along the edge of the track and parallel thereto, wherein the second wheel sets are bogey-mounted to the outward ends of the leaf spring for pivotal movement between the first and second positions.

8 Claims, 7 Drawing Figures

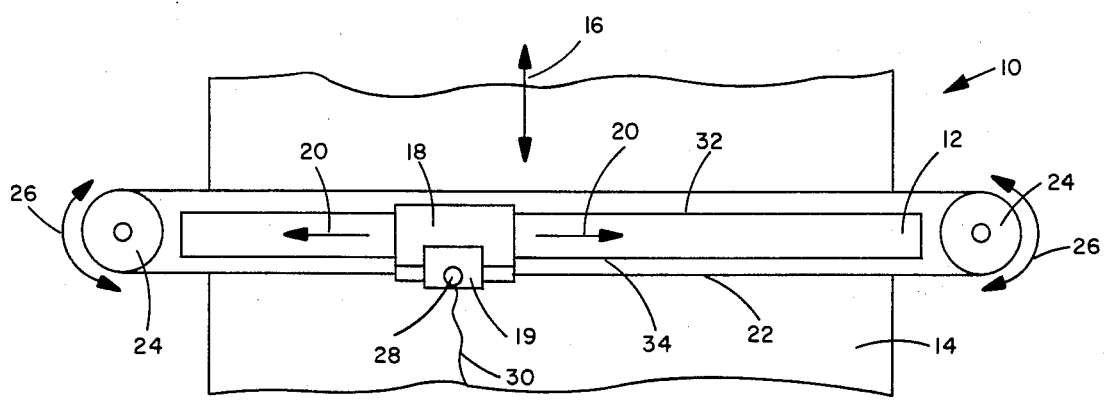
FIG. 1
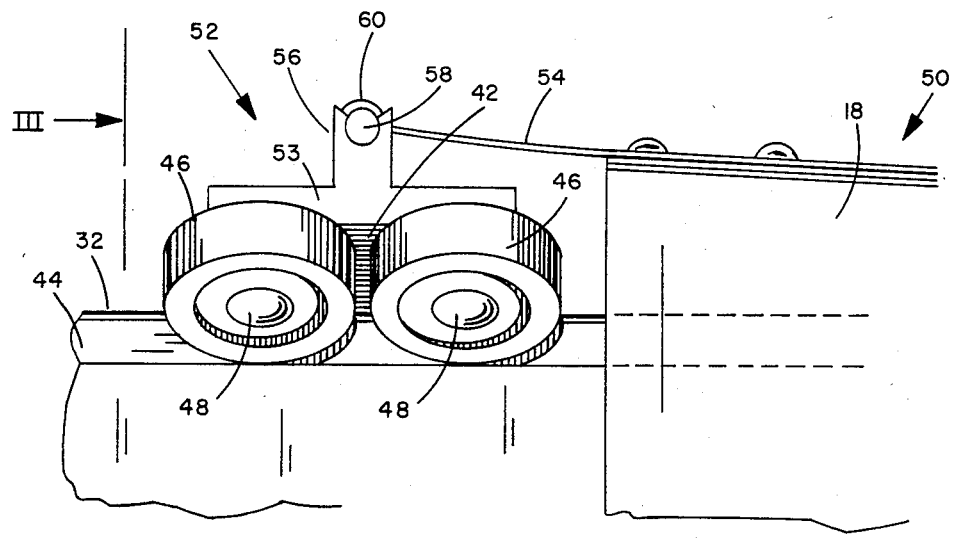
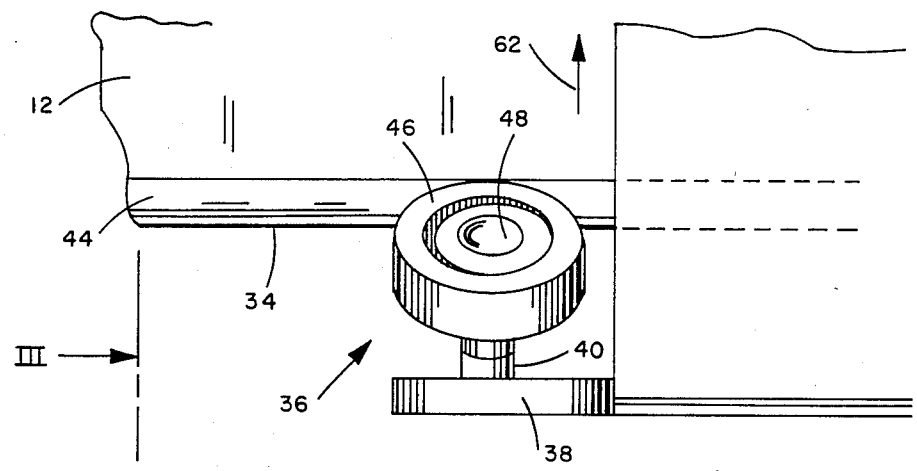
FIG. 2

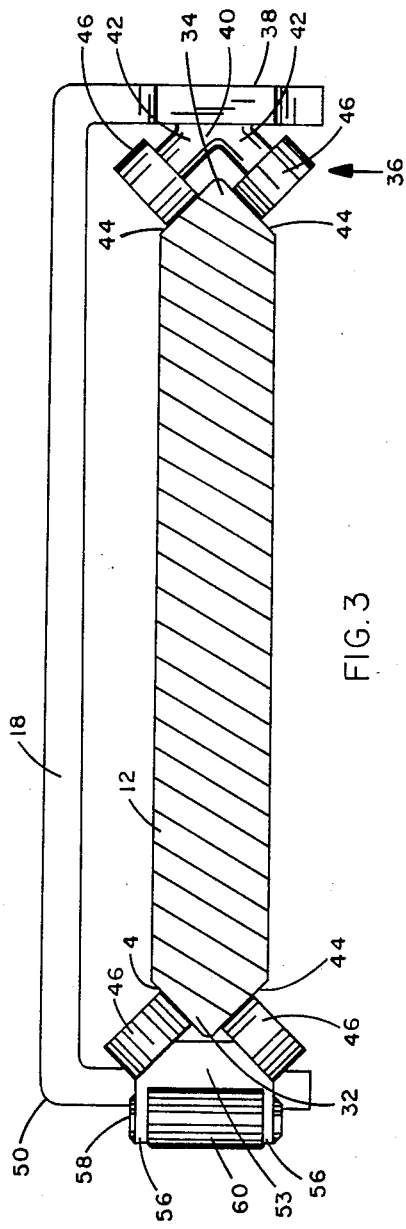
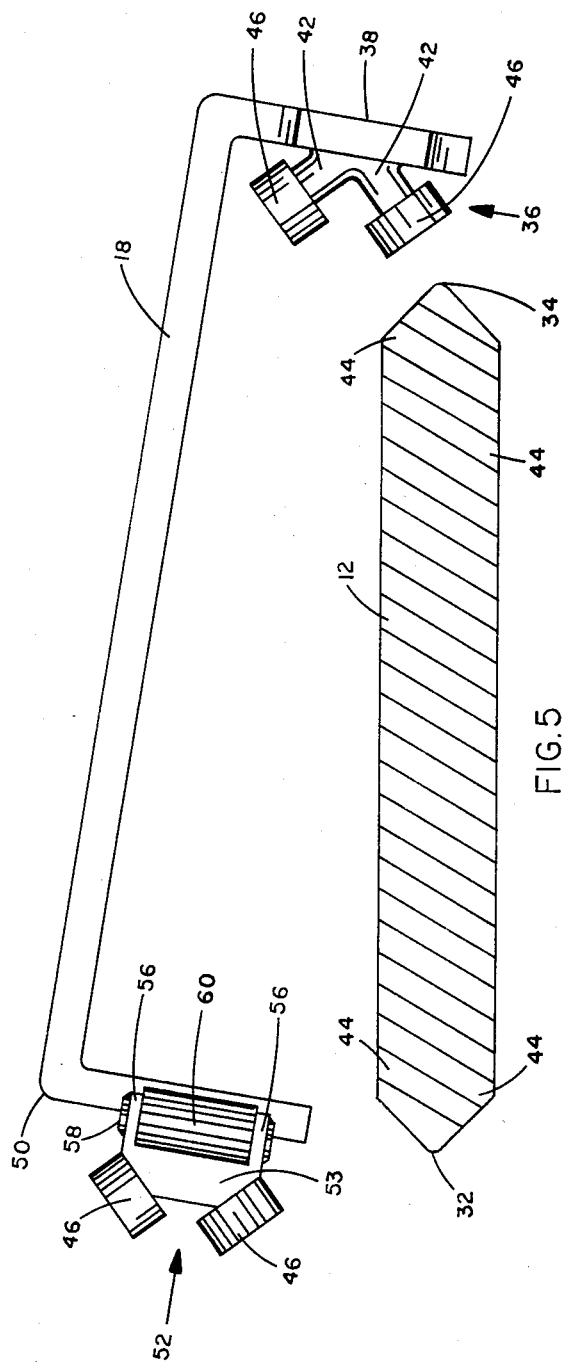

RELEASABLE PEN BLOCK GUIDE

BACKGROUND OF THE INVENTION

The present invention relates to X-Y plotters and, more particularly, to guide rollers for guiding a carriage carrying the pen block of the plotter along the track thereof, wherein the wheels on one edge are releasably mounted to allow the carriage and pen block to be removed from the track easily when desired.

The basic environment of the present invention is illustrated in FIG. 1 in simplified form. A plotter, generally indicated as 10, includes a track 12 disposed parallel to and traversing the path of a sheet of paper 14 (or other media) adapted to be moved longitudinally back and forth beneath the track 12 in the direction of arrows 16 by any of several means (not shown). A pen block carriage 18 for carrying a pen block 19 attached thereto is mounted on the track 12 for longitudinal movement in either direction as indicated by the arrows 20. The carriage 18 is connected to a metal tape 22 passing around the two pulleys 24 disposed on respective ends of the track 12. As the pulleys 24 or tape 22 are driven in either direction (by means not shown) as indicated by the arrows 26, the pen block 19 and carriage 18 are moved in the direction of arrows 20. The pen block 19 carries a pen 28 (or other writing instrument) in contact with the paper 14. As the paper 14 is moved in the direction of arrows 16 and the pen block 19 is moved in the direction of arrows 20, the pen 28 is caused to mark the plot 30 on the paper 14.

In order to provide precision and repeatability in the performance of the plotter 10, the tolerances associated with the parts comprising the carriage 18 and track 12, in particular, are quite exacting. It is typical to provide wheel sets (not shown) at the four corners of the carriage 18 (as FIG. 1 is viewed) bearing against the rear edge 32 and front edge 34 of the track 12 to guide the carriage 18 repeatably in a predetermined path along the track 12. Further, it is known to configure the front and rear edges 32, 34 at an angle (typical between 60° and 120°) and to mount the wheel seats in an angularly matched orientation so as to hold the carriage 18 onto the track 12 against movement in any direction except longitudinally along the track 12 in the direction of arrows 20. In the prior art apparatus employing such a carriage guide arrangement, a small amount of contaminants on one or both of the edges 32, 34 can cause the carriage 18 to bind in its movement on the track 12 to the detriment of the accuracy of the plot being made since the guides are not automatically adjustable. Moreover, in order to remove the carriage 18 and pen block 19 from the track 12 for maintenance (such as removing the contaminants) the process is complex, bothersome, and prone to the introduction of errors in reassembly.

Wherefore, it is the object of the present invention to provide a releasable pen block carriage guide which is easily releasable to allow the pen block to be removed easily from the track for maintenance.

It is yet another object of the present invention to provide a releasable pen block carriage guide which is automatically adjustably.

SUMMARY

The foregoing objects have been met in a graphics plotter having a track disposed parallel and traverse to a moving web and a pen block carriage mounted for movement along the track on sets of wheels bearing on parallel front and rear surfaces of the track by the improvement of the present invention comprising a pair of first wheel sets rigidly attached to one side of the pen block adapted to hold and guide the pen block carriage along the track in a preselected path when held in contact with one of the surfaces of the track; a pair of second, double, bogey-mounted wheel sets carried by the pen block carriage and adapted for movement between a first position in contact with the other of the surfaces of the track and a second position out of contact with the other of the surfaces of the track and spaced from the first wheel sets sufficiently to allow the pen block carriage to be removed from the track; and biasing means carried by the pen block carriage for urging the first and second wheel sets against their respective contacted surfaces when the second wheel sets are placed in the first position.

In the preferred embodiment, the biasing means comprises a leaf spring extending outwardly from the pen block carriage in opposite directions along the other surface of the track and parallel thereto; and, the second wheel sets are releasably mounted to respective ones of the outward ends of the leaf spring for pivotal movement between the first and second positions.

DESCRIPTION OF THE DRAWINGS

FIG. 1 is a simplified plan view of a plotter track and pen block carriage as wherein the present invention is employed.

FIG. 2 is a plan view of one end of a pen block carriage employing the releasable pen block guide mechanism of the present invention.

FIG. 3 is a cutaway view through the track and pen block carriage of FIG. 2 in the plane III—III.

FIG. 5 shows the pen block carriage and guide mechanism of FIG. 4 in the plane V—V.

DESCRIPTION OF THE PREFERRED EMBODIMENT

Figure 4:
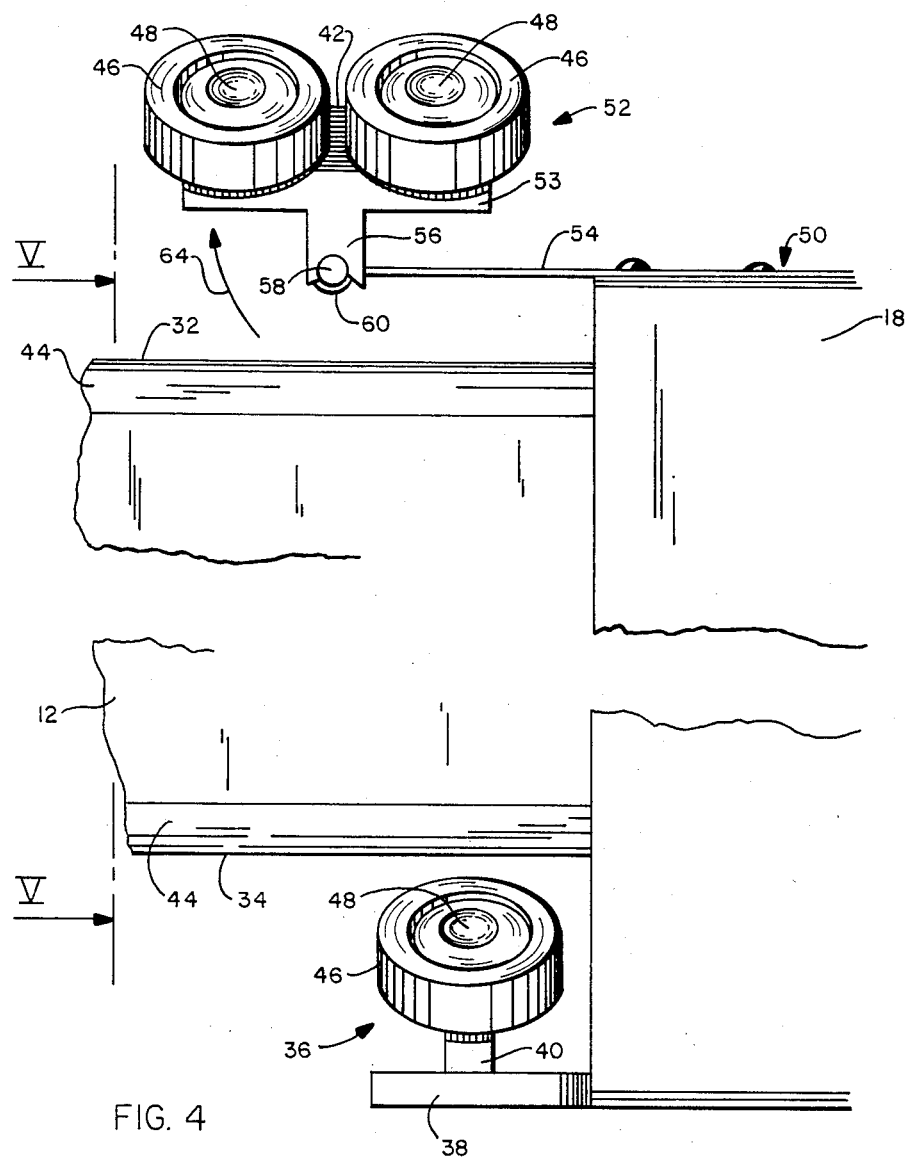
FIG. 4 shows the end of the pen block carriage and guide mechanism of the present invention of FIG. 2 in its released position.

The pen block carriage guide of the present invention is capable of assuming two positions. The first position is one wherein the carriage 18 is held against the track 12 so as to cause the carriage 18 to be held and moved repeatedly along the desired preselected path of longitudinal movement traversing the paper 14. In the second position, the guide is released so as to allow the carriage 18 to be removed from the track 12. The first position is depicted in FIGS. 2 and 3 while the second position is depicted in FIGS. 4 and 5.

Referring first to FIGS. 2 and 3 in combination with FIG. 1 for orientation references, it can be seen that when employing the present invention, it is preferred that the previously described use of a track 12 having front and rear edges 32, 34 configured at angles and with wheel sets employing wheels at an equal angular orientation be employed. As will be seen in greater detail hereinafter, the guide of one edge is rigidly mounted to the carriage 18 while the guide of the opposite edge is mounted for resiliently flexible movement as well as being easily removed. While either edge could be employed for the respective purposes, it is preferred that the front edge 34 employ a rigid guide while the rear edge 32 employ the releasable and flexibly mounted guide since the pen 28 typically is mounted adjacent the front edge 34.

According to the present invention, a pair of wheel sets 36 are provided at opposite ends of the front edge 38 of the carriage 18. The left end of the carriage 18 is shown in FIG. 2. The right end of the carriage 18, according to the present invention, is a mirror image of the left end of FIG. 2 and, therefore, for simplicity is not shown. The wheel sets 36 comprise a support 40 having arms 42 parallel to the two bearing surfaces 44 on the front edge 34 of the track 12. Each of the arms 42 has a guide wheel 46 journal mounted thereto on a headed shaft 48 for rotation. As thus configured, the two guide wheels 46 are positioned and adapted to roll along respective ones of the bearing surfaces 44 as the carriage 18 is moved along the track 12.

The two ends of the rear edge 50 of the carriage 18 are provided with pivotal wheel sets 52. The rear edge 50 has a resiliently flexible leaf spring 54 mounted thereto and extending outward along the rear edge 32 of track 12 and parallel thereto. The pivotal wheel sets 52 are pivotedly mounted to respective ones of the outward ends the leaf springs 54. Each of the pivotal wheel sets 52 comprises a body 53 having a pair of pivotal support arms 56 pivotedly snap mounted on a pin 58 extending through cylinder 60 forming the outward end of the leaf spring 54. The body 53 includes a pair of surfaces 42 at about 90° orientation with at least three guide wheels 46 on headed shafts 48 in a similar manner to the wheel sets 36 previously described and are thereby positioned and adapted to roll along the bearing surfaces 44 of the rear edge 32. As best seen in FIG. 2, with the pivotal wheel sets 52 in their operating position, the leaf spring 54 is flexed so as to create a bias force tending to push the pivotal wheel sets 52 against the bearing surfaces 44 of the rear edge 32 thereby pulling the carriage 18 towards the front edge 34 of track 12 in the direction of arrow 62 so as to hold the rigid wheel sets 36 against the front edge 34. Further, the wheels 46 are bogey-mounted to the body 53 with the pin 58 equally distant between the shafts 48 of the top wheels whereby the wheel sets 52 form a couple about their respective pins 58 tending to hold them against the edge 32 resisting rotation, wobble, and undesired release from the working position of FIG. 2. Thus, it can be seen that this construction automatically positions, holds and adjusts the carriage 18 on the track 12 so as to have it move repeatedly along its desired path of movement.

Figure 6:
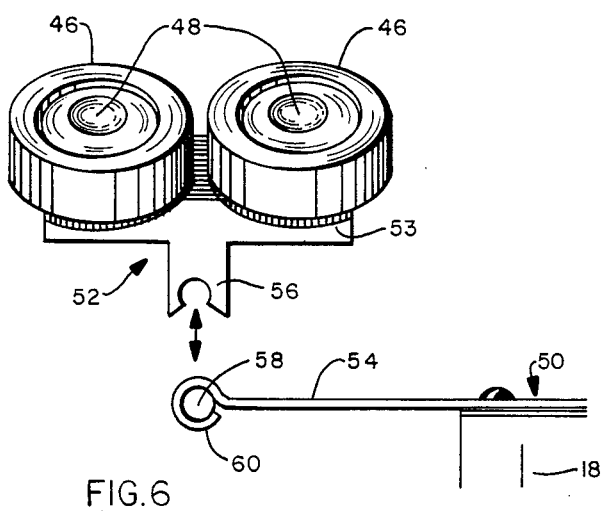
FIG. 6 is a drawing of a bogey-mounted wheel set showing how it can be releasably unsnapped from the pin about which it pivots on the end of the leaf spring.
Figure 7:
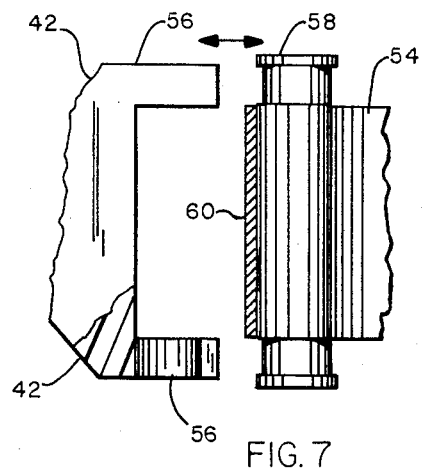
FIG. 7 is a detailed partially cutaway elevation of the snap pivot attachment to the pin on the end of the leaf spring.

Turning now principally to FIG. 4, because of their pivotal mounting to the leaf spring 54, the pivotal wheel sets 52 can be rotated about the pen 58 in the direction of arrow 64 so as to remove the bias pressure of the leaf spring 54 and move the guide wheels 46 of the pivotal wheel sets 52 away from the wheels 46 of the rigid wheel sets 36 a sufficient distance to allow them to clear the front and rear edges 32, 34 of the track 12 so that the carriage 18 can be lifted off of the track 12 as shown in FIG. 5. Moreover, as shown in FIGS. 6 and 7, the wheel sets 52 can be removed independently by unsnapping the arms 56 from the pin 58.

Wherefore, having thus described my invention, I claim:

1. In a graphics plotter having a track disposed parallel and transverse to a moving web of writing medium and a pen block carriage mounted for movement along the track on sets of wheels bearing on parallel front and rear surfaces of the track, the improvement comprising:
   (a) a pair of first wheel sets rigidly attached to one side of the pen block adapted to guide the pen block carriage along the track in a preselected path when held in contact with one of the front and rear surfaces of the track;
   (b) a pair of second wheel sets carried by the pen block carriage and adapted for movement between a first position in contact with the other of the front and rear surfaces of the track and a second position out of contact with said other surface of the track and spaced from said first wheel sets sufficiently to allow the pen block carriage to be removed from the track; and,
   (c) biasing means carried by the pen block carriage for urging said first and second wheel sets against their respective contacted surfaces when said second wheel sets are placed in said first position.

2. The improvement of claim 1 wherein:
   (a) said biasing means comprises a spring extending outwardly from the pen block carriage in opposite directions along said other surface of the track and parallel thereto; and,
   (b) said second wheel sets are mounted to the respective outward ends of said leaf spring for pivotal movement between said first and second positions.

3. The improvement of claim 2 wherein:
   said second wheel sets are bogey-mounted to said ends of said spring.

4. The improvement of claim 2 wherein:
   said second wheel sets releasably snap onto pins carried by said ends of said spring.

5. The improvement of claim 2 wherein:
   said second wheel sets each include a pair of wheels disposed longitudinally adjacent one another.

6. In a graphics plotter having a track and a pen block carriage mounted for movement along the track on sets of wheels bearing on parallel front and rear surfaces of the track, the improvement comprising:
   (a) a pair of first wheel sets carried by the pen block carriage and adapted to guide the pen block carriage along the track in a preselected path when held in contact with one of the front and rear surfaces of the track;
   (b) a leaf spring carried by the pen block carriage extending outwardly from the pen block carriage in opposite directions along the other of the front and rear surfaces of the track and parallel thereto;
   (c) a pair of second wheel sets pivotally bogey-mounted to respective ends of said leaf spring for pivotal movement between a first position in contact with said other surface and a second position out of contact with said other surface and spaced from said first wheel sets sufficiently to allow the pen block carriage to be removed from the track, said second wheel sets further being positioned with respect to said leaf spring such that said leaf spring tends to urge said first and second wheel sets against their respective contacted surfaces when said second wheel sets are placed in said first position.

7. The improvement of claim 6 wherein:
   said second wheel sets releasably snap onto pins carried by said ends of said spring.

8. The improvement of claim 6 wherein:
   said second wheel sets each include a pair of wheels disposed longitudinally adjacent one another.

* * * * *